United States Patent

[11] 3,567,095

[72] Inventors Joseph C. Geist
6401 Cleveland Ave., Lincoln, Nebr. 68507;
William S. Korff, 9215 Valley Stream Road, Clarence, N.Y. 14031; John F. McGibbon, 3300 N. 56th St., Lincoln, Nebr. 68507
[21] Appl. No. 785,149
[22] Filed Dec. 19, 1968
[45] Patented Mar. 2, 1971

[54] BELT STRUCTURE
10 Claims, 11 Drawing Figs.
[52] U.S. Cl. .................................................. 226/172
[51] Int. Cl. .................................................. B65h 29/12
[50] Field of Search ...................................... 226/170, 171, 172; 74/233, 234

[56] References Cited
UNITED STATES PATENTS
2,642,280  6/1953  Fisk .............................. 226/172
3,024,956  3/1962  Gretter ......................... 226/172X Primary Examiner—Allen N. Knowles
Attorneys—F. W. Brunner and Ronald P. Yaist ABSTRACT: A flexible endless belt for use as at least one of the belts in a belt drive assembly of the type in which two belts cooperate to drive and convey elongated articles in the direction of travel of the belts by engaging opposite sides of the article. The belt includes a drive cover, a tension section, and an article-engaging cover of compressible material which includes one or more grooves therein of various cross-sectional configurations which extend longitudinally of the belt. The grooves have at least one cross-sectional dimension smaller than the conveyed article so that the article is wedged in the groove by forcing the article therein. In the most common form of the invention both belts of the assembly are provided with grooves into which opposite sides of the conveyed article are wedged. The invention is particularly useful for conveying extruded aluminum tubing without slippage or damage during its fabrication.

INVENTORS
JOSEPH C. GEIST
WILLIAM S. KORFF
JOHN F. McGIBBON
BY
ATTORNEY

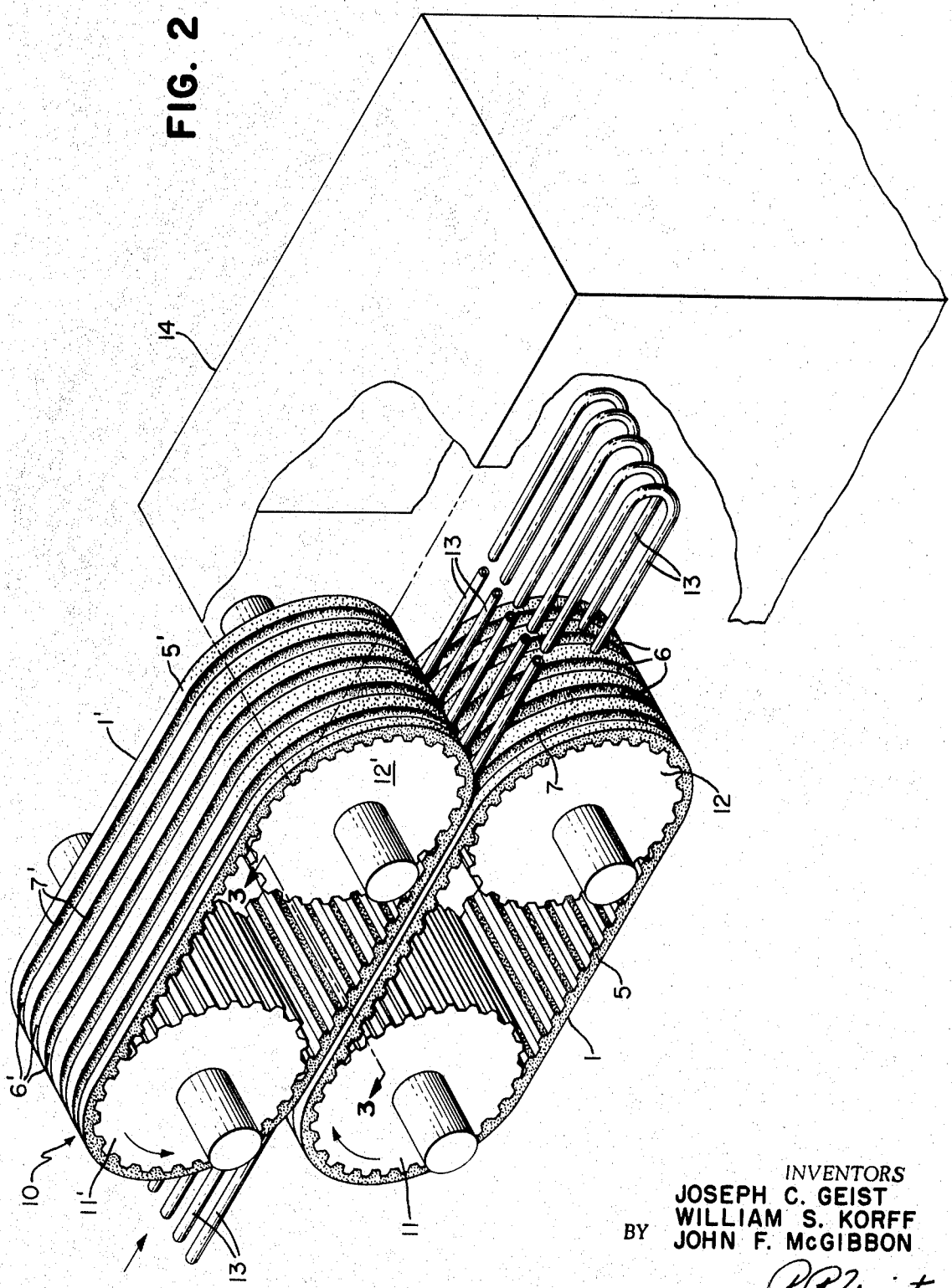

BELT STRUCTURE

BACKGROUND OF THE INVENTION

This invention relates to article-conveying devices and more specifically to endless belts for conveying elongated articles, such as tubes or solid bars of metal or plastic. This invention also has particular application to the specific construction of such belts.

It is common in the art to convey elongated articles by means of a drivebelt arrangement in which a pair of spaced endless belts of flexible material are mounted on pulleys or sheaves in confronting relationship and cooperate to drive and convey the article in the direction of travel of the belt by frictionally engaging its opposite sides. This arrangement is used extensively, for instance, to convey drawn and extruded tubing and the like through the various processing steps, such as cutting and bending, which are necessary to its treatment and fabrication.

The construction of these belts is typical of a transmission-type belt although, in fact, they function as a conveyor belt. Each belt includes a drive cover of flexible material, such as a natural or synthetic elastomer or a textile fabric. This cover may or may not have driving teeth which extend transversely of the belt and contact the driving mechanism of the belt drive assembly. If the drive cover includes teeth, the belt is of the positive drive or synchronous type and the article may be conveyed at a controlled rate. The belts also include an article-contacting or engaging cover of flexible material which is usually more compressible or deformable than the article being conveyed to lessen the likelihood of damage to the article. Accordingly, elastomeric material, such as natural or synthetic rubber, is most commonly used for this purpose. These belts also necessarily include a tension section disposed between the covers to provide longitudinal strength and stability. Because the synchronous belts must possess great strength, preferably a cord reinforcing member of high modulus is employed, for instance, composed of fiber glass or steel cables. The more conventional flat or V-type belts normally include a tension section in the form of cord or square woven textile fabric material, such as cotton, nylon, rayon or polyester.

The article-engaging surfaces of the belts of these devices have usually been substantially flat or planar and, therefore, only a point contact has resulted between each belt and the article being conveyed. A typical prior-art patent illustrating this is Basfor U.S. Pat. No. 3,065,893. Often the point contact pressure is insufficient to attain the necessary total gripping force between the belts and the article to prevent the article from slipping while it is being conveyed. Furthermore, if the point contact pressure is increased to compensate for the slippage, damage to relatively low strength tubing may result.

For example, when extruded aluminum tubing is being conveyed in this manner, slippage occurs due to the presence of a stearate lubricant used during processing which reduces the coefficient of friction between the outer surfaces of the extrusion and the belts. This has been a particular problem when handling extruded tubing preparatory to bending operations to which the tubing is subsequently subjected.

In addition, when the belts of the assembly have substantially flat surfaces, and a number of elongated articles are being conveyed simultaneously, maintaining the proper spacing and alignment between each conveyed article becomes a particular problem. Consequently, it is often necessary to provide guide devices at the entrance and exit ends of the various processing units in order to maintain the proper alignment.

It has been found that these problems have been solved by the present invention in which the article-engaging cover of at least one of the belts of the assembly is provided with one or more longitudinal grooves, each having an article-gripping portion for receiving the conveyed article. The grooves are formed with at least one cross-sectional dimension somewhat smaller than the corresponding cross-sectional dimension of the article so that each article conveyed is wedged therein as the article is forced into the groove. The article is held or gripped along its length in such a manner that a portion of the article extends beyond the surface of the article-engaging cover and is contacted by the other belt in the assembly. The belts of the assembly are positioned in spaced relationship from each other to permit expansion of the groove in at least one of the belts when the conveyed article is wedged in the groove to insure that constant gripping of the article takes place.

Obviously, the article-gripping portion of each groove provides a greater surface area contact with the article being conveyed than is possible with the point contact of the present devices. Therefore, the article is conveyed without slippage and with the possibility of damage significantly reduced. Furthermore, when a plurality of these grooves are provided in substantially parallel relationship, the proper spacing of each article may be easily maintained without the use of guide devices which are currently required.

In the most common form of the invention, the article-engaging cover of each belt of the belt drive assembly is provided with an equal number of grooves. Consequently, when the belts are positioned in spaced confronting relationship, the one or more grooves in one belt are in substantial alignment with the one or more grooves in the other belt so that the conveyed article is wedged therebetween. However, it is also feasible and within the scope of the present invention to provide one belt in the assembly with a substantially flat or planar article-engaging cover which contacts the extending portion of the article. Of course, this arrangement is used only when the article being conveyed has a substantially planar surface which may be appropriately contacted in this manner.

As will hereinafter be described, the grooves of this invention may have various cross-sectional configurations, depending primarily upon the configuration of the article being conveyed.

OBJECTS OF THE INVENTION

It is a principal object of this invention to provide an article-conveying device including two flexible endless belts for driving and conveying elongated articles without slippage between the belts and the article being conveyed.

It is also an object of this invention to provide an article-conveying device including two flexible endless belts for driving and conveying a plurality of articles which will maintain the articles in the proper spaced alignment while they are being conveyed without the necessity of guide devices.

It is another object of this invention to provide a flexible endless belt construction against which elongated articles are wedged to insure constant gripping of the article while it is being conveyed.

It is still another object of this invention to provide a flexible endless belt construction for gripping and conveying extruded aluminum tubing without causing damage thereto.

Other objects and advantages of this invention will become apparent hereinafter as the description proceeds, the novel features, arrangements, and combinations being clearly pointed out in the specification as well as the claims thereunto appended.

BRIEF DESCRIPTION OF THE DRAWINGS

In the drawings:

FIG. 2 is a perspective view of a belt drive assembly which includes two belts of this invention for driving and conveying elongated articles;

DESCRIPTION OF THE PREFERRED EMBODIMENTS

Figure 1:
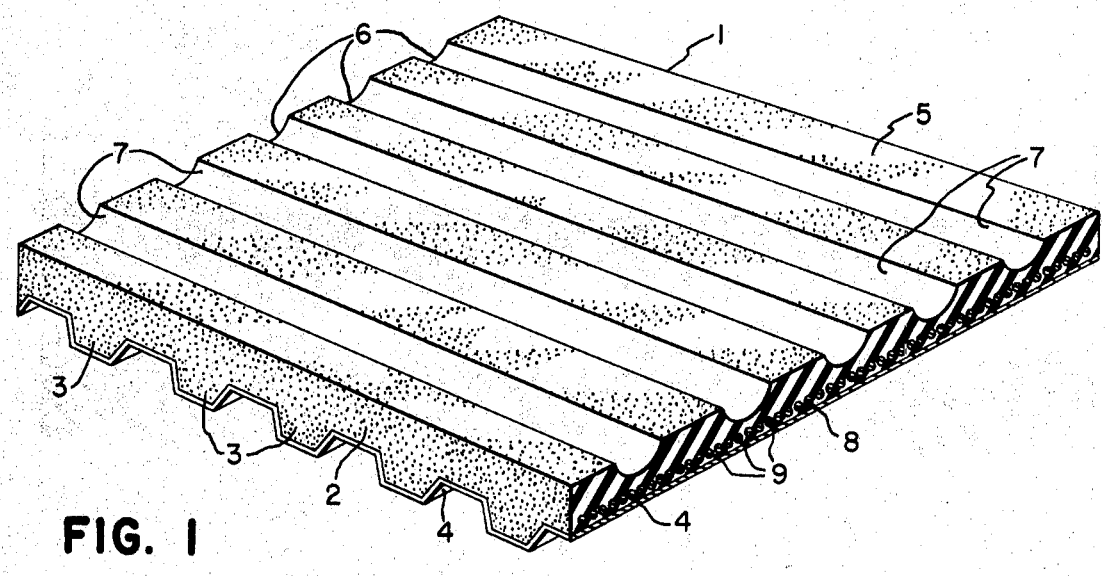
FIG. 1 is a perspective view of a fragmentary section of the belt of this invention.

In FIG. 1, a section of the flexible endless belt 1 of this invention is shown in the form of the typical synchronous transmission belt after vulcanization, for example, in the conventional manner under heat and pressure in a suitable mold. It is to be understood that the endless belt 1 can be either molded in an endless form or be made endless by joining the belt ends together by various means well known in the art. This particular belt 1 has a substantially rectangular cross section and is designed for conveying a number of elongated articles either as individual elements or in continuous lengths. For example, the belt 1 is particularly suitable for conveying extruded aluminum tubing during the various processing steps in its fabrication. The belt of this invention, however, need not be of the synchronous type and also may be in the form of any of the typical transmission belts, such as a flat or V-belt.

The belt 1 includes a drive cover 2 of flexible material, such as rubber or textile fabric, which engages the sheaves or pulleys of the belt drive mechanism. In this instance, since the belt 1 is of the synchronous type, the driver cover 2 includes a plurality of driving teeth 3 extending transversely of the belt 1 although, as previously mentioned, the cover 2 may also be basically flat or planar. The teeth 3 are preferably molded or cut into the cover 2 and engage sprocket grooves in the drive assembly. The drive cover 2 preferably includes a nylon textile fabric facing 4 for increased abrasion resistance.

An article-engaging cover 5 of flexible material, such as natural or synthetic rubber, is positioned on the side of the belt 1 opposite the drive cover 2. Neoprene rubber is particularly suitable for this application because of its property of being resistant to the normal amounts of greases or oils which are commonly present in fabrication operations. As will become apparent, it is extremely important that the cover 5 be more compressible or deformable than the article being conveyed.

A plurality of grooves 6 which extend longitudinally of the belt 1 are preferably molded during vulcanization or subsequently ground, skived, or cut into the cover 5 after vulcanization. Each groove 6 includes an article-gripping portion 7 for receiving an elongated article. At least one cross-sectional dimension of the groove 6 is purposely made smaller than the corresponding cross-sectional dimension of the article so that each article to be conveyed is wedged in the groove against the article-gripping portion 7. Of course, one or more grooves 6 may be provided, with the exact number depending upon the particular application. It should also be understood that the term "article-engaging cover" for the purposes of this invention is meant to include any embodiment in which the cover 5 is a series of raised portions or lugs formed on the belt which include grooves therein, as well as the specific form shown in FIG. 1.

A tension section 8 is disposed between the covers 2 and 5 of the belt 1. The section 8 preferably includes helically wound cord members 9 of high-modulus material, such as filaments of fiber glass or steel, in order to provide the belt 1 with the necessary longitudinal strength and stability. If the belt is of the more conventional flat or V-type, the high modulus material is not required and the tension section may be composed of tire cord or square woven textile fabric of cotton, nylon, rayon or polyester.

In FIG. 2, a typical application of the invention is shown, in which a belt drive assembly 10 includes two belts 1 and 1' provided with the features of this invention. The belts 1 and 1' are positioned in spaced confronting relationship with the belt 1 positioned around the sprocket or toothed pulleys 11 and 12 and the belt 1' positioned around the sprocket or toothed pulleys 11' and 12'. In this way, the grooves 6 provided in the article-engaging cover 5 of the belt 1 are in substantial alignment with the grooves 6' provided in the article-engaging cover 5'. One of the pulleys of each pair of pulleys 11, 12, and 11' and 12', respectively, is driven by an assembly drive mechanism (not shown). It should be understood that if the span of the belts 1 and 1' is unusually long, it may be necessary to include pinch rollers to maintain the proper pressure. Extruded aluminum tubing 13 in individual lengths is fed either from a reel or individually between the belts 1 and 1' and wedged into the grooves 6 and 6', respectively, the sides of which are deformed to receive them. The tubing 13 then is securely gripped while being driven and conveyed in the direction of travel of the belts 1 and 1' into a fabricating machine 14, which may be, for example, a Burr-Oak Bending Machine, where it is bent into a hairpin shape and cut to length. The machine 14 is not part of the invention so it will not be described in further detail. When a plurality of articles, such as the tubes 13, are to be simultaneously conveyed in the preferable arrangement as shown in FIG. 2, the grooves 6 and 6' are provided in substantially parallel relationship in the article-engaging covers 5 and 5'. In this way, the spacing and alignment of the tubes 13 can be properly maintained while they are being conveyed into the machine 14 and the customary guiding devices are not necessary. Since the belts 1 and 1' are positioned in spaced relationship from each other, when the grooves 6 and 6' in the belt 1 and 1', respectively, are expanded the tubing 13 is wedged against the article-gripping portions 7 and 7' to insure constant gripping without slippage even when a lubricant is employed.

Figure 3:
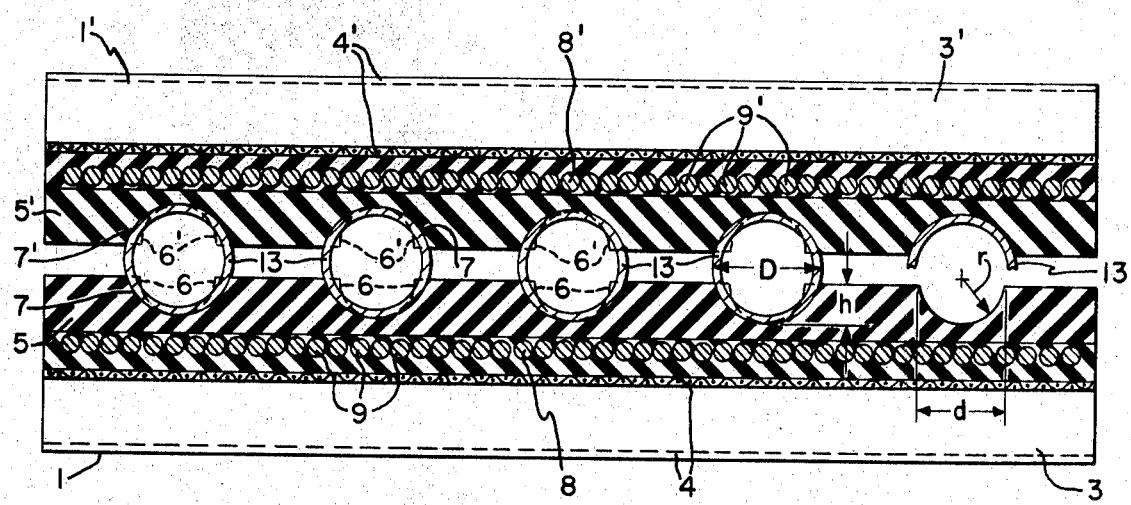
FIG. 3 is an enlarged section taken on line 3–3 of FIG. 2.

The specific gripping action which is a principal feature of the invention is best seen in FIG. 3. As illustrated, the grooves 6 provided in cover 5 of belt 1 are distorted in order to receive the tubing 13 and the original contour of the groove 6 is shown in broken lines. The tubing 13 is wedged in groove 6 against the article-gripping portions 7 in such a manner that a portion of the tubing 13 extends beyond the surface of the article-engaging cover 5 of the belt 1. Part of the extending portion of the tubing 13 is in turn similarly wedged against the article-gripping portions 7' of each groove 6' provided in cover 5' of the belt with the original contour of the grooves 6' again being represented by broken lines. Since the tubing 13 has a generally circular cross section and the grooves 6 and 6' again being represented by broken lines. Since the tubing 13 has a generally circular cross section and the grooves 6 and 6' in each belt 1 and 1', respectively, also have a semicircular or generally U-shaped cross section, opposite sides of each length of the tubing 13 is securely held while it is being driven or conveyed. The increased area of contact between the tubing 13 and the belts 1 and 1' increases the gripping force and consequently reduces the intensity of the point contact pressure which may damage the tubing 13.

Although the specific dimension may vary for each particular application, in the typical example, such as shown in FIG. 3, tubing 13 having an outside diameter D of about ½ will be quite adequately gripped by the confronting belts 1 and 1' provided with grooves 6 and 6', respectively, having a semicircular radius $r$ of about three-sixteenths to seven thirty-seconds inch. Therefore, the cross-sectional width, or in this instance, the diameter $d$ of each groove 6 and 6' is about three-eighths to seven-sixteenths inch which is slightly smaller than the corresponding cross-sectional dimension or outside diameter D of the tubing 13. Also, ⅜-inch groove 6 or 6' would have a typical depth $h$ of about five thirty-second inch.

Of course, the grooves of this invention may have one of any number of cross-sectional configurations, either curvilinear or polygonal, depending primarily upon the particular cross-sectional configuration of the article being conveyed.

FIGS. 4 through 11 illustrate representative examples of the most common configurations likely to be encountered in practical applications. For the purposes of illustration, all the elongated conveyed articles will be represented as solids rather than as hollow tubes. The original contour of the grooves before they are distorted by receiving the article are shown in broken lines.

Figure 4:
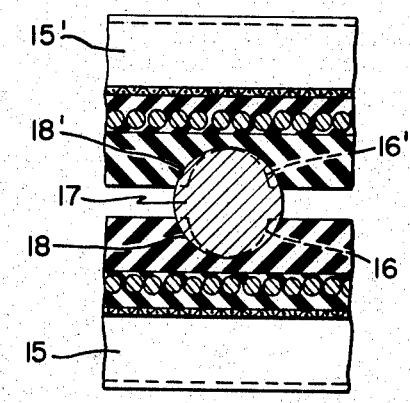
FIGS. 4 through 11 are modifications of the invention shown in FIG. 3.
Figure 5:
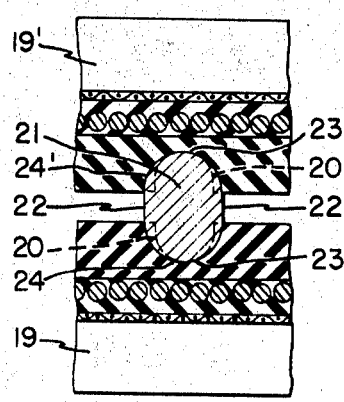

Grooves of curvilinear cross section are illustrated in FIGS. 4 and 5 and are appropriate generally when the article being conveyed has at least a partially arcuate surface. For example, in FIG. 4, the belts 15 and 15' have grooves 16 and 16', respectively, of generally semicircular or U-shaped configuration, and the article 17 being conveyed is of circular cross section and its arcuate surface bears against the gripping portion 18 and 18' of the grooves 16 and 16', respectively, in the same manner as described in FIG. 3. In FIG. 5, the belts 19 and 19' have grooves 20 and 20' of a more conventional U-shaped cross section and the conveyed article 21 has two opposite planar portions 22 and two opposite arcuate portions 23. The arcuate portions 23 bear against the gripping portions 24 and 24' of the grooves 20 and 20', respectively, in the same manner as in FIG. 4.

Figure 6:
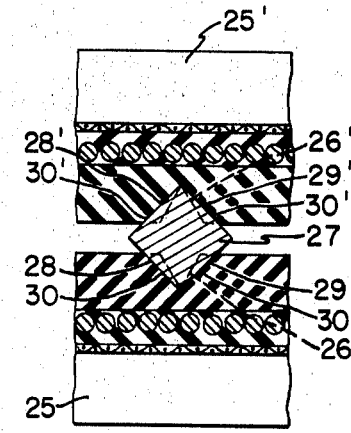
Figure 7:
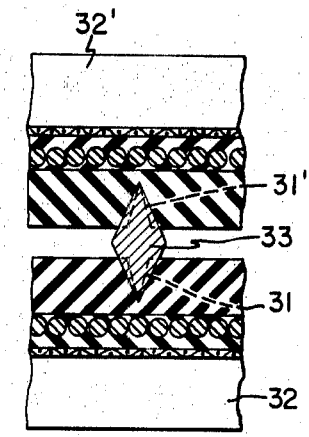
Figure 8:
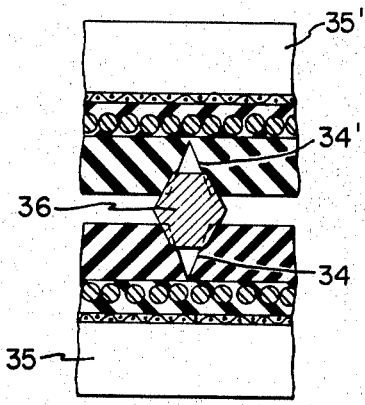
Figure 9:
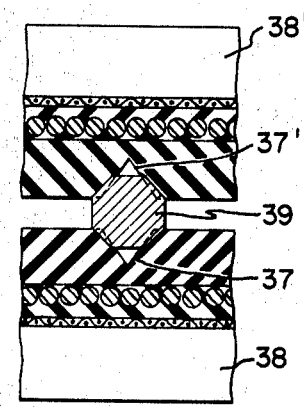
Figure 10:
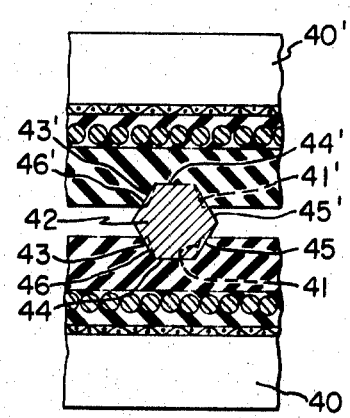

Grooves of polygonal cross section are illustrated in FIGS. 6 through 11 and are appropriate generally when the article being conveyed has at least two relatively planar surfaces. For example, as illustrated in FIG. 6, the belts 25 and 25' have grooves 26 and 26' of generally V-shaped cross-sectional configuration and the conveyed article 27 is of a square or rectangular cross section, a substantial portion of two sides 28, 28' and 29, 29' of which bear against the article-gripping portions 30 and 30', respectively. In addition, as shown in FIG. 7, the V-shaped grooves 31 and 31' of the belts 32 and 32', respectively, are provided for wedging therein an article 33 of generally diamond-shaped cross section. Furthermore, as illustrated in FIGS. 8 and 9, respectively, the V-shaped grooves 34 and 34' of belts 35 and 35' may be used to grip an article 36 having a hexagonal cross section and the grooves 37 and 37' of belts 38 and 38' may be used to grip an article 39 having an octagonal cross section. FIG. 10 illustrates a more special modification in which the belts 40 and 40' include grooves 41 and 41', respectively, of generally trapezoidal cross section which may be used to grip and convey an article 42 which has at least three relatively planar surfaces 43, 44, 45, and 43', 44', 45', at least a substantial portion of which bear against the gripping portions 46 and 46' of the grooves 41 and 41', respectively. An example of an article which may be conveniently conveyed by employing this configuration is the article having a hexagonal cross section as shown in FIG. 8.

Figure 11:
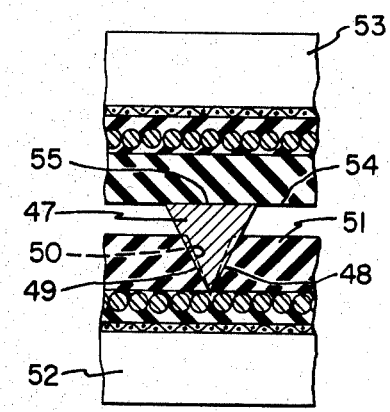

In FIG. 11, another modification is shown which may be appropriate for handling articles with a substantially flat or planar surface which can be contacted conveniently by one belt of the drive belt assembly. For example, the article 47 may have a triangular cross section two sides 48 and 49 of which are wedged into generally V-shaped groove 50 in the article-gripping cover 51 of the belt 52 with a portion of the article 47 extending beyond the cover 51. In this arrangement, the other belt 53 has a substantially flat or planar article-engaging cover 54 which contacts the planar surface 55 of the article 47. Since sufficient contact area is provided between the surface 55 and the cover 54 of the belt 53, the resulting gripping force insures constant gripping of the article 47. In this arrangement it should also be noted that the same result may be accomplished if the relative positions of the belts 52 and 53 are reversed.

It should be apparent to one skilled in the art that adequate gripping action may be attained with other arrangements and combinations in which curvilinear grooves are used with articles having planar surfaces or in which polygonal grooves are used with articles having arcuate surfaces. Nevertheless, it should be pointed out that the maximum gripping action is attained when the article-gripping portion includes the entire groove, as is illustrated in the embodiments of the invention shown in FIGS. 3 through 7, and FIGS. 10 and 11.

While certain representative embodiments and details have been shown for the purpose of illustrating the invention, it will be apparent to those skilled in this art that various changes and modifications may be made therein without departing from the spirit or scope of the invention.

We claim:

1. A pair of endless belts for use in a belt drive assembly of the type in which two belts cooperate to drive and convey elongated articles in the direction of travel of the belts by engaging the article therebetween, at least one of said belts comprising:

A. a drive cover of flexible material forming one surface of the belt to engage the assembly drive means;

B. an article-engaging cover of flexible material which is more compressible than the article, forming the other surface of the belt and including groove means therein extending longitudinally of the belt and having an article-gripping portion for receiving the conveyed article, at least one cross-sectional dimension of the groove means being less than the corresponding cross-sectional dimension of the article so that each conveyed article may be wedged into said groove means to engage said article-gripping portion thereof in such a manner that a portion of the article extends beyond the surface of said article-engaging cover and is contacted by the other belt in the assembly and the belts of the assembly are positioned in spaced relationship from each other to permit expansion of the groove means in at least one of the belts when the conveyed article is wedged therein to insure constant gripping of the article; and C. a tension section disposed between said covers to provide longitudinal strength and stability, all of the elements of the belt structure being joined into an integral composite structure to form an endless belt.

2. The belt as claimed in claim 1 wherein said groove means is at least one groove of curvilinear cross section.

3. The belt as claimed in claim 1 wherein said groove means is at least one groove of polygonal cross section.

4. The belt as claimed in claim 2 wherein said grooves having a generally U-shaped cross section and the article has at least a partially arcuate surface at least a substantial portion of which bears against the gripping portion of said grooves.

5. The belt as claimed in claim 3 wherein said grooves have a generally V-shaped cross section and the article has at least two relatively planar surfaces at least a substantial portion of which bears against the gripping portion of said grooves.

6. The belt as claimed in claim 3 wherein said grooves have a generally trapezoidal cross section and the article has at least three relatively planar surfaces at least a substantial portion of which bears against the gripping portion of said grooves.

7. The belt as claimed in claim 1, and wherein:

a. said drive cover includes a plurality of driving teeth therein extending transversely of the belt which engage the assembly drive means in order that the article is conveyed at a controlled rate;

b. the groove means is a plurality of substantially parallel grooves which maintain each article conveyed in spaced alignment, and the article-gripping portion of each groove includes the entire groove means to provide maximum gripping of each conveyed article; and c. the tension section includes a cord member composed of the material selected from the group consisting of filaments of fiber glass and steel.

8. In a belt drive assembly, the combination of two flexible endless belts which cooperate to drive and convey elongated articles in the direction of travel of the belt by engaging the article therebetween, said belts comprising:

a. a drive cover of flexible material forming one surface of the belt to engage the assembly drive means;

b. an article-engaging cover of flexible material, which is more compressible than the article forming the other surface of the belt;

c. a tension section disposed between said covers to provide longitudinal strength and stability; and d. the improvement comprising: providing said article cover of at least one of said belts with groove means therein extending longitudinally of the belt and having an article-gripping portion for receiving the conveyed article, at least one cross-sectional dimension of the groove means being less than the corresponding cross-sectional dimension of the article so that each article may be wedged in said groove means to engage said article-gripping portion thereof along its length in such a manner that a portion of the article extends beyond the surface of the gripping cover and is contacted by the other belt in the assembly and in the belts of the assembly being positioned in spaced relationship from each other to permit expansion of the groove means in at least one of the belts when the conveyed article is wedged therein to insure constant gripping of the article.

9. The belt drive assembly as claimed in claim 8 wherein the article-engaging cover of each belt has groove means therein and are positioned in spaced confronting relationship so that the groove means in one belt is in substantial alignment with the groove means of the other belt with the conveyed article being wedged therebetween.

10. The belt drive assembly as claimed in claim 8 wherein one belt in the assembly has a substantially planar article-engaging cover which contacts a substantially planar surface of the extending portion of the article.

PO-1050
(5/69)

UNITED STATES PATENT OFFICE
CERTIFICATE OF CORRECTION

Patent No. 3,567,095  Dated  March 2, 1971

Inventor(s) J C Geist, W S Korff, J F McGibbon

It is certified that error appears in the above-identified patent and that said Letters Patent are hereby corrected as shown below:

In the legend, after "Patented Mar. 2, 1971", please add the following:
--(73) Assignee  The Goodyear Tire & Rubber Company
                 Akron, Ohio
                 a corporation of Ohio--.
Column 3, line 21, "driver" should read --drive--.
Column 4, lines 36 through 38, delete "Since the tubing 13 has a generally circular cross section and the grooves 6 and 6' again being represented by broken lines."
Column 6, line 39, delete "and";
         line 63, after "article" insert --engaging--;
         line 74, delete "in".

Signed and sealed this 14th day of September 1971.

(SEAL)
Attest:

EDWARD M.FLETCHER,JR.          ROBERT GOTTSCHALK
Attesting Officer              Acting Commissioner of Patent